(12) United States Patent
Anjo et al.

(10) Patent No.: US 8,928,830 B2
(45) Date of Patent: Jan. 6, 2015

(54) LIQUID CRYSTAL DISPLAY DEVICE

(71) Applicants: Japan Display Inc., Tokyo (JP);
Panasonic Liquid Crystal Display Co., Ltd., Himeji-shi (JP)

(72) Inventors: Kenji Anjo, Oamishirasato (JP);
Tomohiko Ootani, Mobara (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

(21) Appl. No.: 14/264,922

(22) Filed: Apr. 29, 2014

(65) Prior Publication Data
US 2014/0232966 A1    Aug. 21, 2014

Related U.S. Application Data

(63) Continuation of application No. 14/022,825, filed on Sep. 10, 2013, now Pat. No. 8,730,421, which is a continuation of application No. 13/229,782, filed on Sep. 12, 2011, now Pat. No. 8,537,298.

(30) Foreign Application Priority Data

Sep. 28, 2010 (JP) .................................. 2010-217062

(51) Int. Cl.
| | |
|---|---|
| G02F 1/136 | (2006.01) |
| G02F 1/1343 | (2006.01) |
| G02F 1/1345 | (2006.01) |
| G02F 1/1362 | (2006.01) |
| G02F 1/1368 | (2006.01) |

(52) U.S. Cl.
CPC ...... *G02F 1/134336* (2013.01); *G02F 1/13458* (2013.01); *G02F 1/136286* (2013.01); *G02F 1/1368* (2013.01); *G02F 1/134363* (2013.01); *G02F 2001/134318* (2013.01); *G02F 2001/134372* (2013.01); *G02F 2001/136231* (2013.01); *G02F 2001/13629* (2013.01)
USPC .............................................. 349/43; 349/42

(58) Field of Classification Search
USPC ....................................................... 349/42–43
See application file for complete search history.

(56) References Cited

U.S. PATENT DOCUMENTS

| | | | |
|---|---|---|---|
| 4,962,337 | A | 10/1990 | Creed |
| 6,803,974 | B2 | 10/2004 | Kamoshida et al. |
| 7,782,435 | B2 | 8/2010 | Lim |
| 2002/0176032 | A1 | 11/2002 | Maeda et al. |
| 2004/0171200 | A1 | 9/2004 | Maeda |
| 2005/0078260 | A1 | 4/2005 | Ono et al. |
| 2007/0164289 | A1 | 7/2007 | Jung |

(Continued)

FOREIGN PATENT DOCUMENTS

| | | |
|---|---|---|
| JP | 8-194230 | 7/1996 |
| JP | 2002-049049 | 2/2002 |

(Continued)

*Primary Examiner* — Phu Vu
(74) *Attorney, Agent, or Firm* — Antonelli, Terry, Stout & Kraus, LLP.

(57) ABSTRACT

In a liquid crystal display which includes a liquid crystal layer between a TFT substrate and a counter substrate, a gate electrode, a gate insulator and a semiconductor layer are laminated. A pixel electrode is formed on the gate insulator and metal source and drain electrodes are formed on the semiconductor layer and gate insulator. At least upper surfaces of the source and drain electrode contain Mo. The source is directly laminated on a portion of the pixel electrode, which portion is disposed on the gate insulating film.

9 Claims, 6 Drawing Sheets

(56) References Cited

U.S. PATENT DOCUMENTS

| | | |
|---|---|---|
| 2008/0186440 A1 | 8/2008 | Lim et al. |
| 2009/0180069 A1 | 7/2009 | Nishimura |
| 2010/0201932 A1 | 8/2010 | Gotoh et al. |
| 2011/0109861 A1 | 5/2011 | Son et al. |

FOREIGN PATENT DOCUMENTS

| | | |
|---|---|---|
| JP | 2009-168878 | 7/2009 |
| JP | 2011-107678 | 6/2011 |
| KR | 10-2002-0022570 | 3/2002 |
| KR | 10-0849599 | 7/2008 |
| KR | 10-2008-0097055 | 11/2008 |
| WO | WO 01/18597 A1 | 3/2001 |

LIQUID CRYSTAL DISPLAY DEVICE

CROSS-REFERENCE TO RELATED APPLICATIONS

This application is a continuation application of U.S. application Ser. No. 14/022,825, filed Sep. 10, 2013, which, in turn is a continuation application of Ser. No. 13/229,782, filed Sep. 12, 2011 (now U.S. Pat. No. 8,537,298), the entire contents of which are incorporated herein by reference.

CLAIM OF PRIORITY

The present application claims priority from Japanese Patent Application JP 2010-217062 filed on Sep. 28, 2010, the content of which is hereby incorporated by reference into this application.

FIELD OF THE INVENTION

The present invention relates to a display device, and more particularly, to a liquid crystal display device of lateral electric field mode that can achieve excellent viewing angle characteristics and reduce the production cost.

BACKGROUND OF THE INVENTION

A liquid crystal display panel used in a liquid crystal display device includes a TFT substrate in which pixels each having a pixel electrode, a thin film transistor (TFT), and the like, are arranged in a matrix form. A counter substrate is disposed opposite to the TFT substrate, in which color filters, and the like, are formed at positions corresponding to the pixel electrodes of the TFT substrate. Further, a liquid crystal is interposed between the TFT substrate and the counter substrate. Thus, the liquid crystal display panel is designed to form an image by controlling the transmittance of light of the liquid crystal molecules for each pixel.

The liquid crystal display device is flat and light weight, and is used in a wide range of applications in various fields. Small liquid crystal display devices are widely used in portable electronic devices such as mobile phones and digital still cameras (DSC). In the case of the liquid crystal display device, viewing angle characteristics are a problem. The viewing angle is a phenomenon in which the brightness changes or the color changes between when the display is viewed from the front, and when the display is viewed from an oblique direction. The viewing angle characteristics are excellent in the in plane switching (IPS) mode to drive liquid crystal molecules by the electric field in the horizontal direction.

There are many different types of IPS mode. For example, a common electrode or a pixel electrode is formed in a planar shape, on which a comb-like pixel electrode or common electrode is disposed with an insulating film interposed therebetween. In this way, the liquid crystal molecules are rotated by an electric field generated between the pixel electrode and the common electrode. This type can increase the transmittance and is currently a mainstream IPS mode.

The above type of IPS has been configured as follows. First, a TFT is formed. Then, the TFT is covered by a passivation film, on which a common electrode, an insulating film, a pixel electrode, and the like, are formed. However, there is a requirement to reduce production costs. So it is designed to reduce the number of layers disposed on the TFT substrate, such as the conductive film and the insulating film.

As an example of the IPS mode in which the common electrode is formed on the lower layer of the passivation film, JP-A No. 168878/2009 describes a configuration in which a common electrode is formed on the same layer as a gate electrode. Then, a comb-like pixel electrode is formed between a gate insulating film and a protective insulating film.

Figure 5:
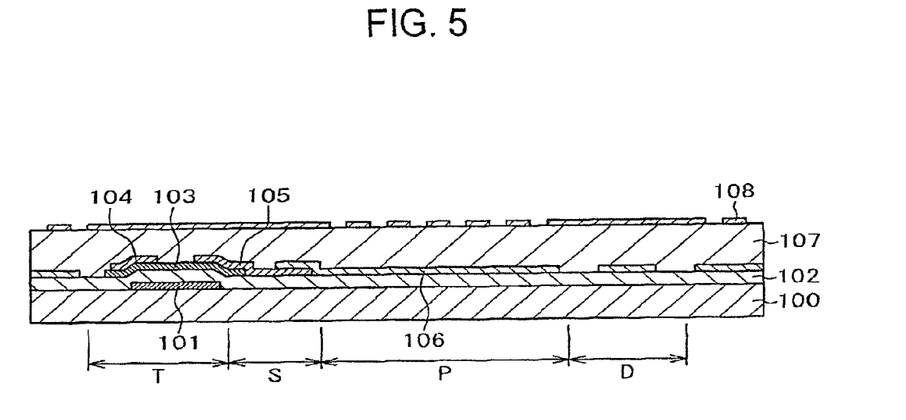
FIG. 5 is a cross-sectional view of the TFT substrate of an existing liquid crystal panel.

FIG. 5 is a cross-sectional view of a TFT substrate 100 of IPS mode to which the present invention is applied. FIG. 5 shows a configuration in which the number of layers is reduced in the IPS mode. Note that the configuration of FIG. 5 is different from the configuration of the IPS described in JP-A No. 168878/2009. In FIG. 5, a gate electrode 101 is formed on the TFT substrate 100 of glass. The gate electrode 101 is formed, for example, by depositing MoCr on AlNd alloy. A gate insulating film 102 is formed by sputtering SiN on the gate electrode 101.

A semiconductor layer 103 is formed on the gate insulating film 102 above the gate electrode 101. An a-Si film is formed as the semiconductor layer 103 by CVD. A drain electrode 104 and a source electrode 105 are placed opposite to each other on the semiconductor layer 103. The drain electrode 104 and the source electrode 105 are simultaneously formed from MoCr. The area between the drain electrode 104 and the source electrode 105 is a channel layer in the TFT. Note that in order to achieve ohmic contact, an n+Si layer not shown is formed between the semiconductor layer 103 and the drain electrode 104 or the source electrode 105.

In FIG. 5, after the formation of the drain electrode 104 or the source electrode 105, a pixel electrode 106 is formed from ITO in a planar shape. A portion of the pixel electrode 106 is overlapped with the source electrode 105 to establish electrical contact between the pixel electrode 106 and the source electrode 105. Then, a passivation film 107 is formed to cover the drain electrode 104, the source electrode 105, the pixel electrode 106, and the like. The passivation film 107 is formed from SiN by CVD. Normally, the passivation film 107 is to protect the TFT. In FIG. 5, however, the passivation film 107 also serves as an insulating film between a common electrode 108 and the pixel electrode 106.

The common electrode 108 is formed in a comb-like shape on the passivation film 107. Further, an oriented film not shown is formed on the common electrode 108. Then, a liquid crystal layer is present on the oriented film. The liquid crystal layer is interposed between the TFT substrate 100 and a counter substrate, not shown, on which color filters and the like are formed. In FIG. 5, T represents the area in which the TFT is formed, S represents the area in which the source electrode 105 is formed, P represents the area in which the pixel electrode 106 is formed, and D represents the area in which an image signal line 20 is formed.

Figure 6:
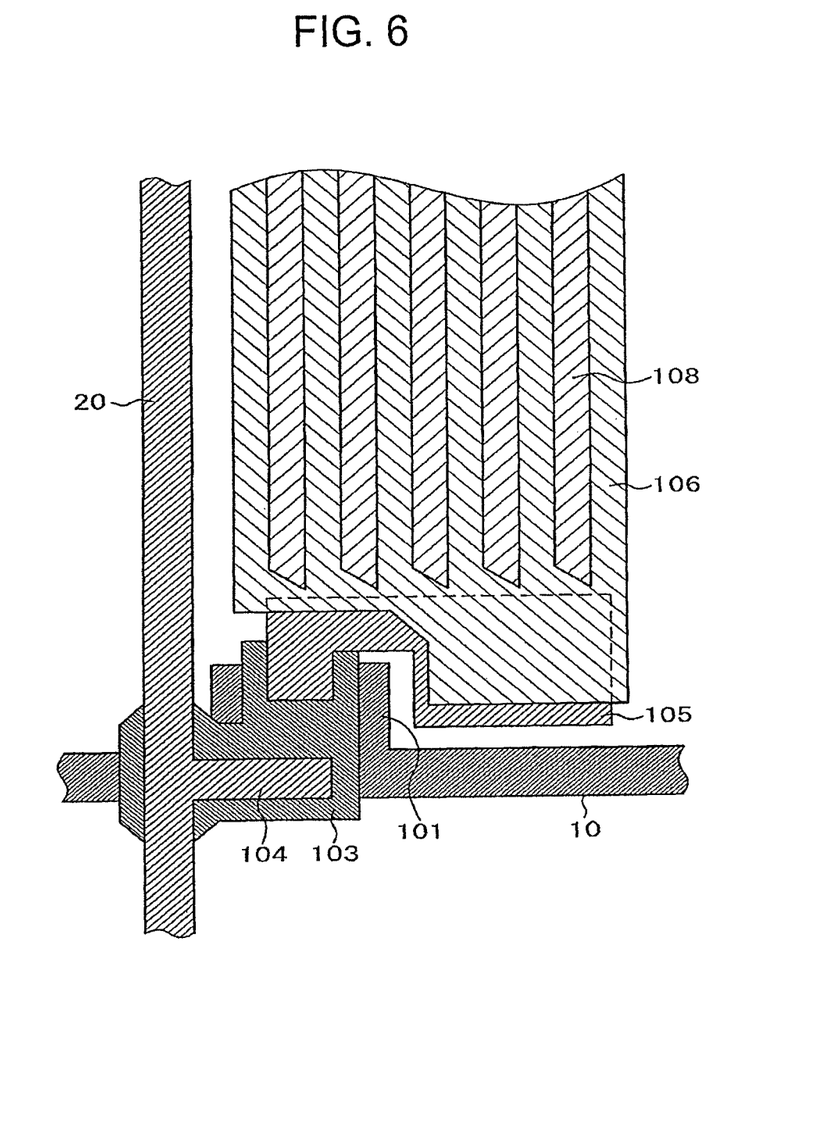
FIG. 6 is a top view of the TFT substrate of the existing liquid crystal display panel.

FIG. 6 is a top view of the TFT, the pixel electrode 106, the common electrode 108, and the like. In FIG. 6, the semiconductor layer 103 is formed on the gate electrode 101. The drain electrode 104 and the source electrode 105 are placed opposite to each other on the semiconductor layer 103. The drain electrode 104 is a branch of the image signal line 20. The gate electrode 101 is a branch of a scan line 10.

In FIG. 6, the pixel electrode 106 is formed in a rectangular shape. A portion of the pixel electrode 106 covers a portion of the source electrode 105 to establish contact between the pixel electrode 106 and the source electrode 105. The comb-like common electrode 108 is placed on the rectangular pixel electrode 106 with the passivation film 107 not shown interposed therebetween.

When an electric field is applied between the common electrode 108 and the pixel electrode 106, the liquid crystal molecules are rotated by the lateral component of the electric field. In this way, the transmittance of the backlight is controlled in each pixel to form an image.

Figure 7A:
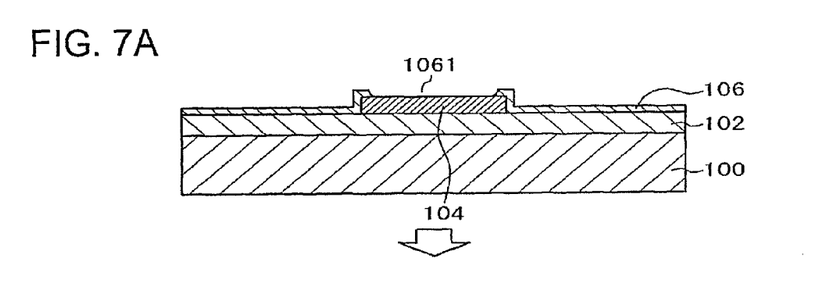
FIGS. 7A, 7B, 7C are views of the problem with the TFT substrate of the existing liquid crystal display panel.
Figure 7B:
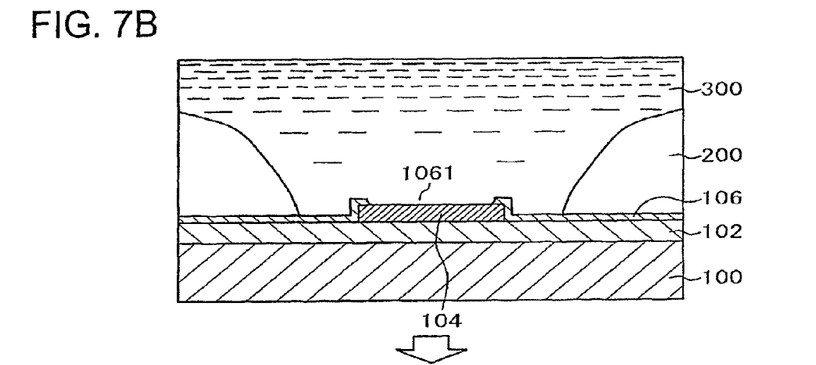
Figure 7C:
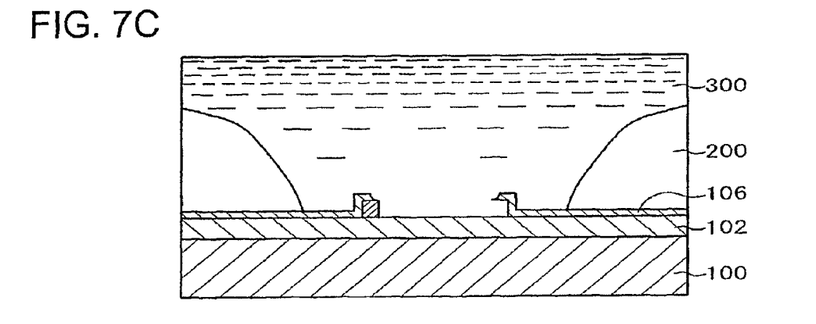

FIGS. 7A, 7B, 7C are views of the problem with such a configuration as shown in FIG. 6. The patterning of the pixel electrode 106 is performed by photolithography. More specifically, after coating of a resist 200 which is, for example, a negative resist, the necessary part of the resist 200 is exposed so as to be insoluble in a developer 300. The part of the resist 200 without being exposed is removed by the developer 300. During the resist is removed by the developer or after the resist is removed, the ITO is exposed in the stripper for a certain period of time. If there is a pin hole in the ITO, cell reaction occurs between ITO and MoCr due to the existence of the developer in the portion of the pin hole. As a result, the MoCr is rapidly etched and disappears.

FIG. 7A, 7B, 7C are views of this phenomenon. FIG. 7A shows the sate in which a pin hole 1061 is present in the pixel electrode 106, which is formed from ITO, in the area where the resist 200 is not present. When the resist is of the negative type, the portion of the resist 200 where the ITO should remain is exposed to be insoluble in the developer 300. The other portion of the resist 200 is dissolved in the developer 300. FIG. 7B shows the state in which the developer 300 is present.

In FIG. 7B, the developer 300 directly comes into contact with the source electrode 105 through the ITO pin hole. At this time, cell reaction occurs between the ITO and the MoCr forming the source electrode 105 through the developer 300. The source electrode 105 is etched rapidly. Then, as shown in FIG. 7C, the source electrode 105 disappears in the ITO pin hole. This phenomenon could possibly cause disconnection of the source electrode 105.

The foregoing description focuses on the problem of the portion of the source electrode 105. However, since the source electrode 105, the drain electrode 104, and the image signal line 20 are formed on the same layer, the same problem can also occur in the image signal line 20, the drain electrode 104, and the like. In particular, this problem is serious in the image signal line 20 because it is narrow and long. In other words, the image signal lien 20 is more likely to be disconnected. This leads to the risk of a low production yield as well as a low reliability.

SUMMARY OF THE INVENTION

The present invention addresses the above problems, and aims to improve the production yield and reliability in an IPS liquid crystal display device with a smaller number of layers to reduce production costs.

The present invention overcomes the above problems by means of the following steps. That is, first a pixel electrode is patterned on a gate insulating film. After the formation of the pixel electrode, a source electrode, a drain electrode, and an image signal line are formed. In this process, the source electrode, the drain electrode, and the image signal line, which are formed from MoCr, are not present when the ITO is patterned to form the pixel electrode. Thus, these electrodes will not be dissolved in the developer. As a result, these electrodes will not be removed by the cell reaction with the ITO.

In the layer structure obtained by the process described above, the source electrode is overlapped with an end portion of the ITO pixel electrode. Thus, it is possible to establish contact between the source electrode and the pixel electrode in the same manner as in the existing layer structure.

According to the present invention, the source electrode, the drain electrode, or the image signal line is not dissolved in the developer for the patterning of the ITO when the ITO is patterned to form the pixel electrode. As a result, it is possible to achieve a liquid crystal display device with high production yield and high reliability. Further, according to the present invention, it is also possible to achieve an IPS liquid crystal display device with a small number of layers, and thus requiring less production costs.

DETAILED DESCRIPTION OF THE PREFERRED EMBODIMENT

Hereinafter, the present invention will be described in detail with an exemplary embodiment.

First Embodiment

Figure 1:
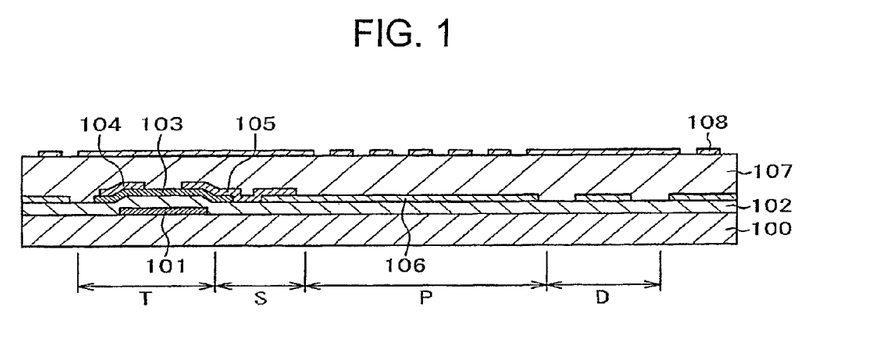
FIG. 1 is a cross-sectional view of a TFT substrate of a liquid crystal display panel according to the present invention.

FIG. 1 is a cross-sectional view of a TFT substrate 100 according to a first embodiment of the present invention. In FIG. 1, the configuration is the same as the configuration described above with reference to FIG. 5, except for the order of laminating a pixel electrode 106 and a source electrode 105. Thus, the repeated description will be omitted. In FIG. 1, a gate electrode 101 has a two-layer structure, in which the lower layer is formed from AlNd alloy 200 nm thick, and the upper layer is formed from MoCr alloy 40 nm thick. The two-layer structure serves to prevent the ITO laminated on the terminal portion from reacting with AlNd when a terminal portion, which will be described below, is formed on the same layer as the gate electrode 101.

On the gate electrode 101, a gate insulating film 102 is formed with a thickness of about 350 nm by CVD. Then, an a-Si film, which is the semiconductor layer 103, is formed with a thickness of about 150 nm by CVD on the gate insulating film 102. The feature of the present invention is that the pixel electrode 106 is first formed on the gate insulating film 102, without simultaneously forming the source electrode 105, the drain electrode 104, the image signal line 20, and the like.

In general, the patterning of the pixel electrode 106 is performed by photolithography. After the patterning of the pixel electrode 106, MoCr is deposited by sputtering, for example, to a thickness of about 77 nm. Then, the MoCr layer is patterned by photolithography to form the source electrode 105, the drain electrode 104, and the image signal line 20. At this time, a portion of the source electrode 105 is overlapped with a portion of the pixel electrode 106 formed from ITO. This makes it possible to provide conductivity between the source electrode 105 and the pixel electrode 106.

Figure 3:
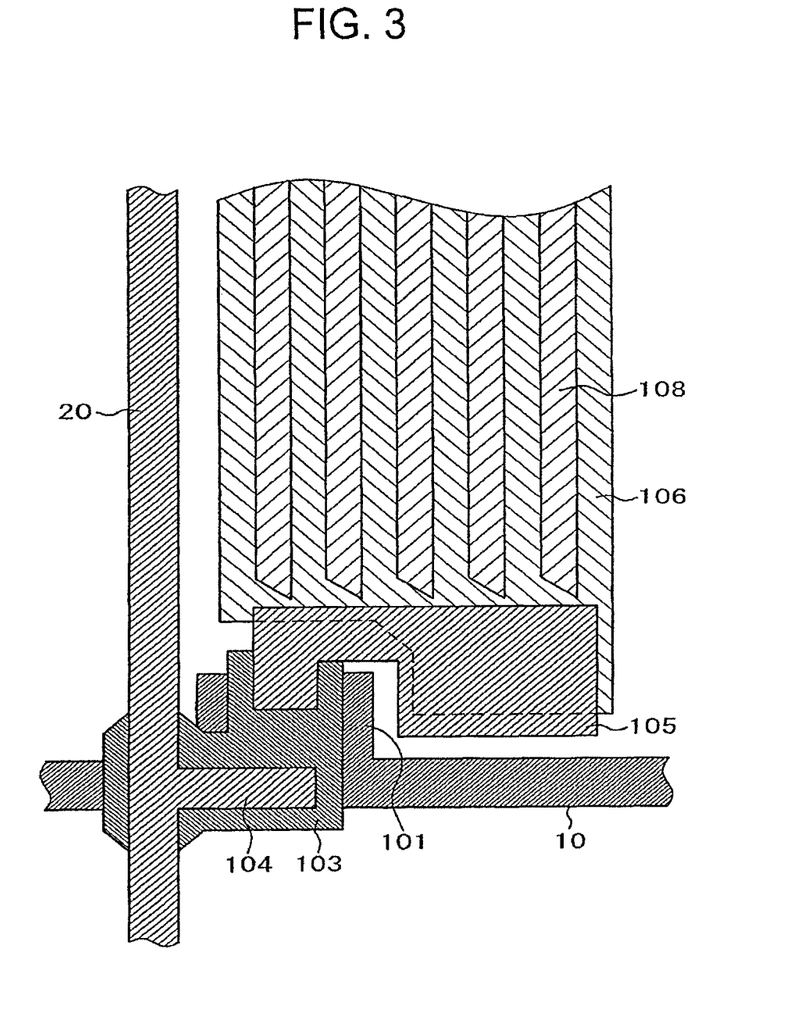
FIG. 3 is a top view of the TFT substrate of the liquid crystal display panel according to the present invention.

When the photolithography is performed to pattern the ITO which is the pixel electrode 106, the source electrode 105, the drain electrode 104, the image signal line 20, and the like, are not formed yet. Thus, even if a pin hole is present in the ITO, the source electrode 105, the drain electrode 104, the image signal line 20, and the like, on the lower layer are not dissolved due to the cell reaction of the resist 200 through the developer 300, unlike contrary cases in the past. Note that the pixel electrode 106 is a planar electrode as shown in FIG. 3.

After the pixel electrode 106 is patterned, MoCr is deposited by sputtering and is patterned to form the source electrode 105, the drain electrode 104, and the image signal line 20. At this time, when the source electrode 105 and the like are patterned, ITO and MoCr are laminated in the area where the resist 200 is removed on the MoCr film. If a pin hole or other small aperture is present in MoCr, the MoCr is consumed by the cell reaction in the portion of the pin hole. However, the MoCr in this portion is the portion to be removed and there is no problem with this.

As described above, according to this embodiment of the present invention, the source electrode 105, the drain electrode 104, and the image signal line 20 are not consumed by the cell reaction through the developer 300 at the time when the ITO is patterned to from the pixel electrode 106. For this reason, disconnection or other failure does not occur due to the cell reaction. As a result, it is possible to achieve the liquid crystal display device with high production yield and high reliability.

Then, the passivation film 107 is formed from SiN by CVD to a thickness of about 500 nm. Then, the common electrode 108 is formed in a comb-like shape on the passivation film 107. This is the same as FIG. 5. Further, an oriented film is formed on the comb-like common electrode 108. Then, a liquid crystal is interposed between the common electrode 108 and the counter substrate in which color filters and the like are formed. This is also the same as in the description of FIG. 5.

While the above description assumes that MoCr is used to form the source electrode 105 and the like, the material of the source electrode 105 and the like is not limited to MoCr. The effect of the present invention can be obtained even if the source electrode 105, the drain electrode 104, and the image signal line 20 are formed from other metals as long as they have a cell reaction with the ITO forming the pixel electrode 106.

Figure 2:
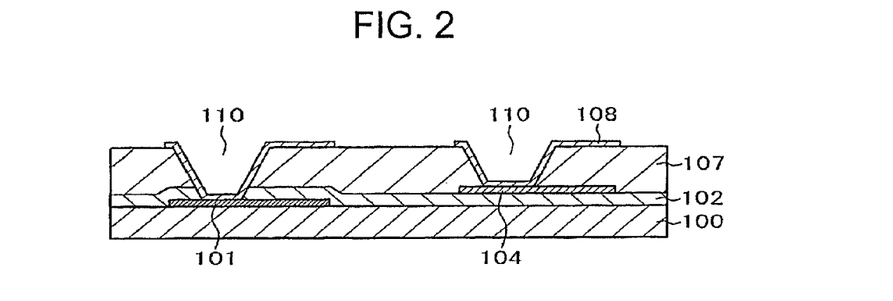
FIG. 2 is a cross-sectional view of an end portion of the TFT substrate according to the present invention.

FIG. 2 shows a cross-sectional configuration of the terminal portion corresponding to the configuration of the display area shown in FIG. 1. In the terminal portion on the left side of FIG. 2, a terminal leader is formed on the same layer as the scan line 10 or the gate electrode 101. In this example, a through hole is formed in the passivation film 107 and the gate insulating film 102. Then, the through hole 110 is covered by ITO to form the terminal portion.

In the terminal portion on the right side of FIG. 2, a terminal leader is formed on the same layer as the image signal line 20, the source electrode 105, the drain electrode 104 and the like. In this example, a through hole 110 is formed in the passivation film 107. Then, the through hole 110 is covered by ITO to form the terminal portion. The ITO used for the terminal is formed on the same layer as the common electrode 108. Thus, the configuration of the terminal portion according to this embodiment of the present invention is the same as the configuration of the existing terminal portion.

FIG. 3 is a top view of the pixel part, showing the present invention. FIG. 3 shows that the scan line 10 branches to form the gate electrode 101, that the semiconductor layer 103 is formed through the gate insulating film 102 not shown, and that the image signal line 20 branches to form the drain electrode 104. This is the same as FIG. 6. Note that the semiconductor layer 103 is formed not only in the TFT part, but also at the intersection between the scan line 10 and the image signal line 20. This is to prevent the image signal line 20 from being disconnected at the intersection.

A feature of FIG. 3 is that the pixel electrode 106 is formed prior to the formation of the drain electrode 104, the source electrode 105, the image signal line 20 and the like. After the planar pixel electrode 106 is formed, the MoCr film is deposited by sputtering and then patterned to form the drain electrode 104, the source electrode 105, and the image signal line 20. Thus, in FIG. 3, the pixel electrode 106 is formed on the lower side of the laminated portion of the pixel electrode 106 and the source electrode 105.

Figure 4:
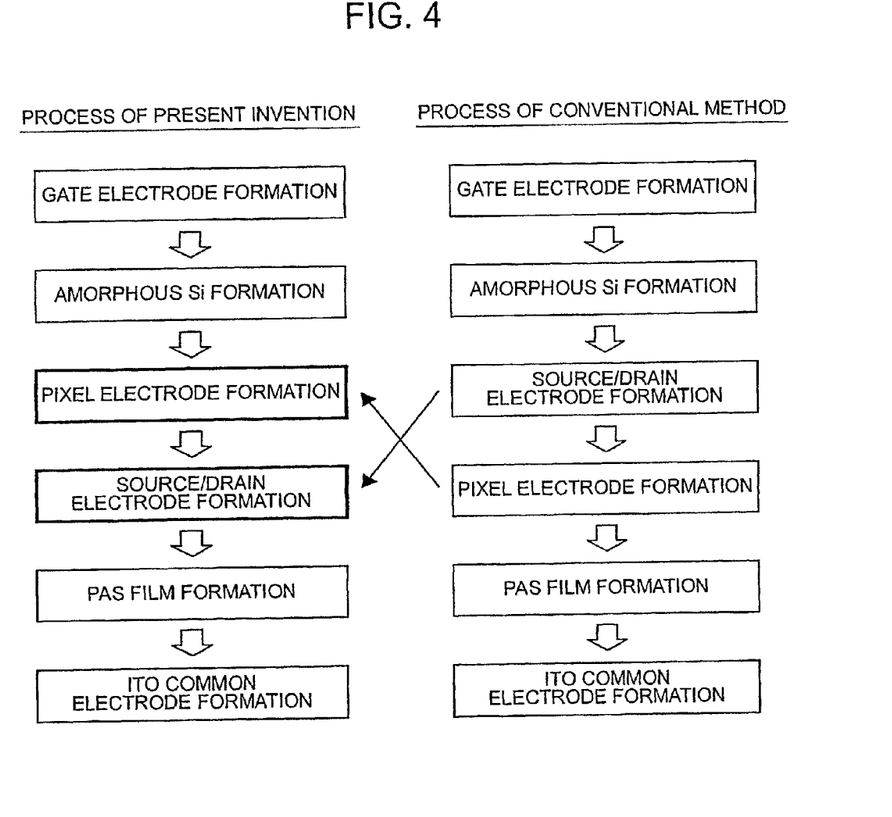
FIG. 4 is a view of the production process of the TFT substrate according to the present invention.

In FIG. 4, the production process of the TFT substrate 100 side according to this embodiment of the present invention is compared with the existing production process. The gate electrode 101 is formed on the TFT substrate 100, and is covered by the gate insulating film 102. Then, a-Si is formed as the semiconductor layer 103. This process is the same as the existing process.

After the formation of a-Si in the existing production process, the source electrode 105 and the drain electrode 104 are formed first, and then the pixel electrode 106 is formed. On the other hand, according to this embodiment of the present invention, the pixel electrode 106 is formed after the formation of a-Si, and then the source electrode 105 and the drain electrode 104 are formed. This is very different from the existing production process. After that, the passivation film 107 is formed to cover the pixel electrode 106. Then, the comb-like common electrode 108 is formed. This is the same in the process according to this embodiment of the present invention and in the process according to the conventional example.

As described above, according to the present invention, it is possible to significantly reduce the risk of disconnection of the image signal line 20, the drain electrode 104, and the source electrode 105. Thus, in the IPS liquid crystal display device with a smaller number of layers, it is possible to significantly increase the production yield and to reduce production costs.

What is claimed is:

1. A liquid crystal display device comprising:
   a TFT substrate;
   a counter substrate;
   a liquid crystal layer interposed between the TFT substrate and the counter substrate;
   a gate electrode, a gate insulating film, and a semiconductor layer formed on the TFT substrate in this order:
      a pixel electrode formed on the gate insulating film;
      a drain electrode and a source electrode formed on the semiconductor layer and the gate insulating film,
      an insulating film formed on the drain electrode, the source electrode, and the pixel electrode; and
      a common electrode formed on the insulating film and which has a comb-like shape comprising a plurality of slits,
   wherein the drain electrode and the source electrode are comprised of metal, and at least upper surfaces of the drain electrode and the source electrode contain Mo,
   wherein the source electrode is directly laminated on a portion of the pixel electrode, and the portion is disposed on the gate insulating film, and
   wherein each of the plurality of slits of the common electrode is not overlapped with the source electrode.

2. A liquid crystal display device according to claim 1,
wherein the source electrode is directly laminated on the portion of the pixel electrode after the pixel electrode has been patterned by a developer to prevent the source electrode from being etched by a cell reaction between the pixel electrode and the source electrode due to the presence of the developer.

3. A liquid crystal display device according to claim 2, wherein the source electrode is comprised of MoCr Alloy.

4. A liquid crystal display device according to claim 3,
wherein a leader formed on the same layer as the gate electrode extends in a terminal portion, and
wherein an ITO formed on the same layer as the common electrode is laminated onto the leader.

5. A liquid crystal display device according to claim 3,
wherein a leader formed on the same layer as the source electrode extends in a terminal portion, and
wherein an ITO formed on the same layer as the common electrode is laminated onto the leader.

6. A liquid crystal display device according to claim 1,
wherein a leader formed on the same layer as the gate electrode extends in a terminal portion, and
wherein an ITO formed on the same layer as the common electrode is laminated onto the leader.

7. A liquid crystal display device according to claim 6,
wherein the source electrode is directly laminated on the portion of the pixel electrode after the pixel electrode has been patterned by a developer to prevent the source electrode from being etched by a cell reaction between the pixel electrode and the source electrode due to the presence of the developer.

8. A liquid crystal display device according to claim 1,
wherein a leader formed on the same layer as the source electrode extends in a terminal portion, and
wherein an ITO formed on the same layer as the common electrode is laminated onto the leader.

9. A liquid crystal display device according to claim 8,
wherein the source electrode is directly laminated on the portion of the pixel electrode after the pixel electrode has been patterned by a developer to prevent the source electrode from being etched by a cell reaction between the pixel electrode and the source electrode due to the presence of the developer.

\* \* \* \* \*